(12) United States Patent
Kametani

(10) Patent No.: US 7,099,324 B2
(45) Date of Patent: Aug. 29, 2006

(54) SYSTEM AND METHOD FOR PROCESSING PACKETS

(75) Inventor: Jun Kametani, Tokyo (JP)

(73) Assignee: Nec Corporation, (JP)

( * ) Notice: Subject to any disclaimer, the term of this patent is extended or adjusted under 35 U.S.C. 154(b) by 810 days.

(21) Appl. No.: 09/732,402

(22) Filed: Dec. 7, 2000

(65) Prior Publication Data

US 2003/0037042 A1    Feb. 20, 2003

(30) Foreign Application Priority Data

Dec. 8, 1999   (JP) ................. 11-348422

(51) Int. Cl.
*H04L 12/56* (2006.01)
*G06F 12/02* (2006.01)

(52) U.S. Cl. .................. 370/392; 370/355; 707/3; 711/205

(58) Field of Classification Search ........... 370/392, 370/395.7, 395.72, 412, 415, 418–429, 414, 370/355; 707/3, 1, 200; 709/238; 711/202
See application file for complete search history.

(56) References Cited

U.S. PATENT DOCUMENTS

| | | | | |
|---|---|---|---|---|
| 3,984,817 A * | 10/1976 | Barbour et al. | ............. | 711/160 |
| 5,434,799 A | 7/1995 | Aguilhon et al. | | |
| 5,710,915 A | 1/1998 | McElhiney | | |
| 5,754,547 A | 5/1998 | Nakazawa | | |
| 5,844,499 A * | 12/1998 | Min | ........................... | 340/7.52 |
| 6,157,644 A * | 12/2000 | Bernstein et al. | ........... | 370/392 |
| 6,295,526 B1 * | 9/2001 | Kreiner et al. | ................. | 707/2 |
| 6,304,912 B1 * | 10/2001 | Oguchi et al. | ............. | 709/238 |
| 6,466,985 B1 * | 10/2002 | Goyal et al. | ................ | 709/238 |
| 6,553,002 B1 * | 4/2003 | Bremer et al. | ............... | 370/254 |
| 6,553,031 B1 * | 4/2003 | Nakamura et al. | .......... | 370/392 |
| 2004/0202184 A1* | 10/2004 | Yazaki et al. | .......... | 370/395.31 |

FOREIGN PATENT DOCUMENTS

| | | | |
|---|---|---|---|
| JP | 03225412 A | * | 10/1991 |
| JP | 6-261078 | | 9/1994 |
| JP | 10-139943 | | 5/1998 |
| JP | 10-145417 | | 5/1998 |
| JP | 11-232285 | | 8/1999 |
| JP | 2000295274 | | 10/2000 |

* cited by examiner

*Primary Examiner*—Doris H. To
*Assistant Examiner*—Saba Tsegaye
(74) *Attorney, Agent, or Firm*—Dickstein, Shapiro, Morin & Oshinsky, LLP.

(57) ABSTRACT

A searching system allowing high-speed data searching and operation is disclosed. A search table is provided which stores a copy of an entry that has been retrieved from a database to retrievably store a plurality of retrieved entries. Further, an address pointer table is provided which stores a list of retrieved entries which are linked from a leading one to a bottom one. A search processor can access a plurality of retrieved entries by referring to the list stored in the address pointer table so as to be consistent with a corresponding entry stored in the database when the corresponding entry has been updated.

22 Claims, 6 Drawing Sheets

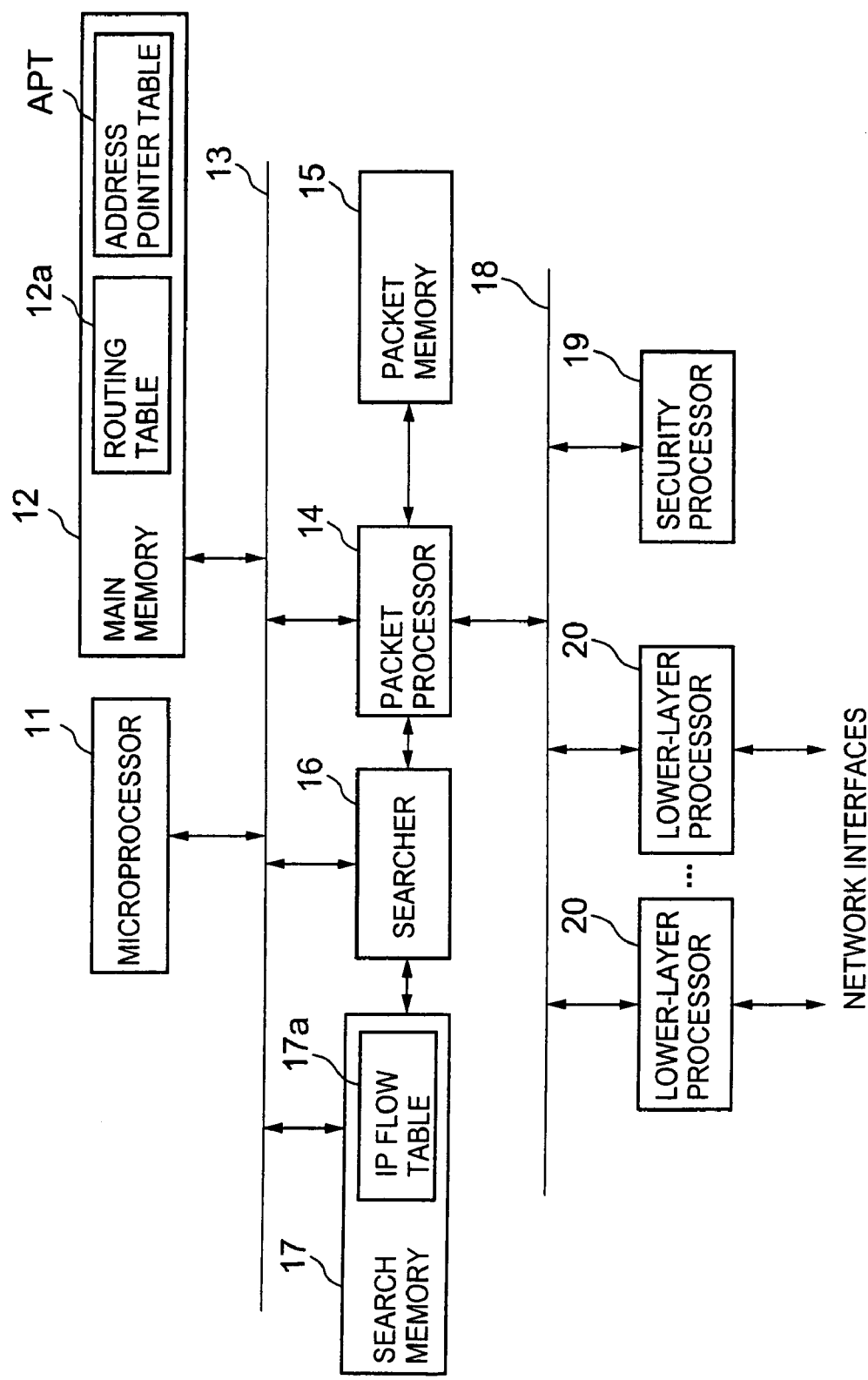

FIG.2

IP FLOW TABLE

| SEARCH KEY | | ROUTING RESULT | | | SECURITY INFORMATION | | | |
|---|---|---|---|---|---|---|---|---|
| IP SOURCE ADDRESS | IP DESTINATION ADDRESS | MAC SOURCE ADDRESS | MAC DESTINATION ADDRESS | OUTPUT PORT No. | ENCRYPTION ALGORITHM | ENCRYPTION KEY | NEW IP SOURCE ADDRESS | NEW IP DESTINATION ADDRESS |
| AA BB CC DD | EE FF GG HH | 123456 | 789012 | 2 | | | | |
| AA BB CC DD | KK LL MM NN | | | 9 | DES-CBC | XXXXXX | AA BB CC XX | KK LL MM YY |
| AA BB CC XX | KK LL MM YY | 123456 | 789012 | 2 | | | | |
| KK LL MM YY | AA BB CC XX | | | 9 | DES-CBC | YYYYYY | | |
| ... | ... | ... | ... | ... | ... | ... | ... | ... |

SYSTEM AND METHOD FOR PROCESSING PACKETS

BACKGROUND OF THE INVENTION

1. Field of the Invention

The present invention relates to table searching techniques and in particular to a table searching system and method for use in, for example, a database system or a switching system such as a packet switching system or a router.

2. Description of the Related Art

In a packet communication network, typically the Internet, packet transmission from a source to a destination is performed by packet switches such as routers, each of which forwards a received packet to a next hop node based on the destination address of the packet. Recently, in addition to the packet routing operation, the need may arise for a router to handle additional processing for IPsec (IP Security). IPsec is a security protocol working at layer 3 and is expected to become the standard for virtual private networks (VPNs) on the Internet. Therefore, the need for a high-speed router is growing and several techniques have been proposed.

The inventor has proposed an improved packet switch in Japanese Patent Application No. 11-098140 filed on Apr. 5, 1999 (Unexamined Publication No. P2000-295274A published on Oct. 20, 2000). The proposed packet switch uses a table searching hardware device to allow a burden upon a microprocessor to be reduced, resulting in increased routing and IPsec processing speed.

More specifically, the packet switch is provided with an IP flow table registering a routing result obtained by the routing process using the source and destination addresses of an IP packet as a search key. When receiving an IP packet, the IP flow table is searched using the IP source and destination addresses of the received packet as a search key. When a hit is found in the IP flow table, the microprocessor performs a forwarding operation of the packet based on the found routing result information without performing the routing process. Similarly, by performing IPsec processing with a security processor as hardware, the packet switching with security processing can be performed at high speeds.

In routing and IPsec processing, recently, handling new IP (Internet Protocol) traffic of encapsulated packets or Aggregated flow has been required of a router. Aggregated flow includes a plurality of IP packets to be transferred to the same destination router. More specifically, these IP packets are aggregated by an encapsulating header whose routing information is determined based on the IP destination and source addresses of the included packets. In this case, an IP traffic of original IP packets is called Micro flow.

The proposed packet switch as described above can achieve the simplified device configuration and the high-speed switching by performing the forwarding processing of original packets (Micro flow) and encapsulated packets (Aggregated flow) with the same hardware.

In the case where the processing procedure for aggregated IP traffic is changed due to, for example, invalidation of security association, however, update of the table searching hardware device cannot be completed rapidly. More specifically, since entries in the IP flow table are created in the order in which IP traffic appeared, the microprocessor searches the IP flow table for entries related to the aggregated IP traffic and, when a hit is found, the microprocessor can update the found entry depending on a change of the aggregated IP traffic.

Such a search process as described above is performed for all the entries in the IP flow table. Therefore, in the case of a large number of entries, the time required for the search is not negligible. Further, during the search, the primary search operation for switching cannot be performed. Accordingly, the search speed of the packet switch is reduced and thereby the packet switch throughput is also lowered.

One method for solving such a problem may be considered such that the address of entry for each IP flow (micro flow) is directly stored in a database including a routing table. But it is not preferable. In general, it is not determined how many micro flows belong to a single aggregated flow. Therefore, it is difficult to estimate the size of database and therefore an vacancy may be generated in the ensured database area.

The same problem may occur in not only a router but also any searching system. For example, consider that a searching system having a dedicated search table in addition to a database is designed to store data that has been searched for into the dedicated search table. In such a searching system, when the search is started, the dedicated search table is first searched and, if no hit is found in the dedicated search table, then the database is searched. In order to ensure high-speed searching, the capacity of the dedicated search table should be limited. Accordingly, if there is data with low use frequency or data after the expiration of a preset time interval, then the data should be deleted from the dedicated search table in the order of registration.

Especially, in the case where a plurality of pieces of data are associated with each other, it is not easy to be consistent with the database. When a chain of pieces of data is deleted from the database, the related data should be deleted from the dedicated search table. At this time, it is necessary to search the dedicated search table for all related data. Therefore, high-speed searching and updating operation cannot be achieved.

SUMMARY OF THE INVENTION

An object of the present invention is to provide a searching system and method allowing high-speed data searching and updating operation.

Another object of the present invention is to provide a packet switching method and system allowing high-speed packet routing operation.

According to the present invention, a data searching system includes: a database for storing a plurality of pieces of data; a search table for storing at least one piece of data which has been selected by the database; and an address pointer table for storing location information indicating an entry address of each piece of data stored in the search table and/or relationship information among entry addresses of pieces of data stored in the search table.

The address pointer table may include a plurality of memory blocks each having a fixed length on a recording medium, wherein the memory blocks are located at consecutive addresses, wherein each of the memory blocks comprises: a first area for storing an entry address indicating a location of a corresponding piece of data stored in the search table; and a second area for storing one of a next block address and a bottom-indicating flag, the next block address indicating an address of a memory block storing data following the corresponding piece of data, and the bottom-indicating flag indicating that a current memory block is a bottom of a list.

The data searching system may further include a controller controlling such that the search table is searched for a desired piece of data before the database and, if a hit is found in the search table, then a found piece of data is used as a search result, and if no hit is found in the search table, then the database is searched for the desired piece of data and a found piece of data is used as a search result and is registered into the search table, wherein a piece of data with low retrieved frequency is deleted from the search table according to a predetermined condition and all linked memory blocks related to the deleted piece of data are released into available memory blocks.

According to another aspect of the present invention, a packet processing system includes: a microprocessor; a routing table; a searcher having a search memory connected thereto, wherein the search memory stores a search table which is used to increase in search speed for packet forwarding; and an address pointer table for storing location information indicating an entry address of each piece of data stored in the search table and/or relationship information among entry addresses of pieces of data stored in the search table. The address pointer table may be provided in a main memory of the microprocessor or in the search memory.

The address pointer table may include a plurality of memory blocks each having a fixed length on a recording medium, wherein the memory blocks are located at consecutive addresses, wherein each of the memory blocks comprises: a first area for storing an entry address indicating a location of a corresponding piece of data stored in the search table; and a second area for storing one of a next block address and a bottom-indicating flag, the next block address indicating an address of a memory block storing data following the corresponding piece of data, and the bottom-indicating flag indicating that a current memory block is a bottom of a list.

In the packet processing system as described above, when the routing table has been updated, the address pointer table is accessed based on contents of an entry to be changed to obtain location information of the entry to be changed and entries related to the entry to be changed in the search memory, and the entry and related entries are changed so as to be consistent with the routing table.

According to still another aspect of the present invention, a system includes: a first memory for retrievably storing a plurality of entries; a second memory for storing a copy of an entry that has been retrieved from the first memory to retrievably store a plurality of retrieved entries; a third memory for storing a list of retrieved entries which are linked from a leading one to a bottom one; and a data controller for accessing a desired retrieved entry by referring to the list stored in the third memory.

The data controller may process the desired retrieved entry so as to be consistent with a corresponding entry stored in the first memory when the corresponding entry has been processed.

According to further another aspect of the present invention, a packet switching system includes: a routing table for retrievably storing a plurality of routing entries; a flow table for storing a copy of a routing entry indicating a packet flow that has been retrieved from the routing table to retrievably store a plurality of retrieved packet flows; an address pointer table for storing a list of retrieved packet flows which are linked from a leading one to a bottom one; a search processor for accessing a desired retrieved packet flow in the flow table by referring to the list stored in the address pointer table; and a microprocessor performing a packet routing control.

When a routing entry has been designated to be processed according to predetermined routing processing, the search processor may process a corresponding retrieved packet flow in the flow table so as to be consistent with the designated routing entry stored in the routing table.

Each of the routing entries stored in the routing table may have a first indicator and a second indicator, the first indicator indicating which one of a single packet flow and an aggregated packet flow the routing entry relates to, wherein the aggregated packet flow comprises a plurality of single packet flows linked, and the second indicator indicating a leading address of the list in the address pointer table.

The list of retrieved packet flows may include a plurality of memory blocks each corresponding to the retrieved packet flows, each of the memory blocks comprising an address of a corresponding retrieved packet flow in the flow table and a next pointer indicating one of an address of a next memory block following the memory block and an address of the memory block itself.

When an aggregated routing entry stored in the routing table is designated, the search processor may access the address pointer table depending on the second indicator of the aggregated routing entry to trace the list of single packet flows related to the aggregated routing entry so as to access the single packet flows related to the aggregated routing entry.

The search processor may process the single packet flows related to the aggregated routing entry so as to be consistent with the routing table when the routing table has been updated.

A packet switching method includes the steps of: a) retrievably storing a plurality of routing entries in a routing table; b) storing a copy of a routing entry indicating a packet flow that has been retrieved from the routing table to retrievably store a plurality of retrieved packet flows in a flow table; c) storing a list of retrieved packet flows which are linked from a leading one to a bottom one in an address pointer table; and d) accessing a desired retrieved packet flow in the flow table by referring to the list stored in the address pointer table.

The step (d) may include the steps of: when a packet flow corresponding to a received packet fails to be found in the search table, searching the routing table for the packet flow; registering the found packet flow as a routing result into the search table; determining whether the found packet flow is a micro flow belonging to an aggregated flow; when the found packet flow is the micro flow, searching the search table for a bottom retrieved packet flow of the list corresponding to the aggregated flow; adding the found packet flow to the bottom retrieved packet flow stored in the search table; and when the found packet flow is not the micro flow, storing an address of the found packet flow in the search table into a corresponding routing entry in the routing table.

The step (d) may include the steps of: when an aggregated routing entry has been designated to be deleted, deleting each of the retrieved packet flows included in a list related to the aggregated routing entry from the address pointer table until finding a bottom retrieved packet flow of the list; releasing a chain of the retrieved packet flows formed in the address pointer table to make them available; deleting a retrieved packet flow corresponding to the aggregated routing entry from the flow table; and deleting the aggregated routing entry from the routing table.

BRIEF DESCRIPTION OF THE DRAWINGS

FIG. 1 is a diagram showing a packet switching system according to an embodiment of the present invention;

FIG. 2 is a diagram showing an example of an IP flow table in the embodiment;

DESCRIPTION OF THE PREFERRED EMBODIMENT

Figure 3:
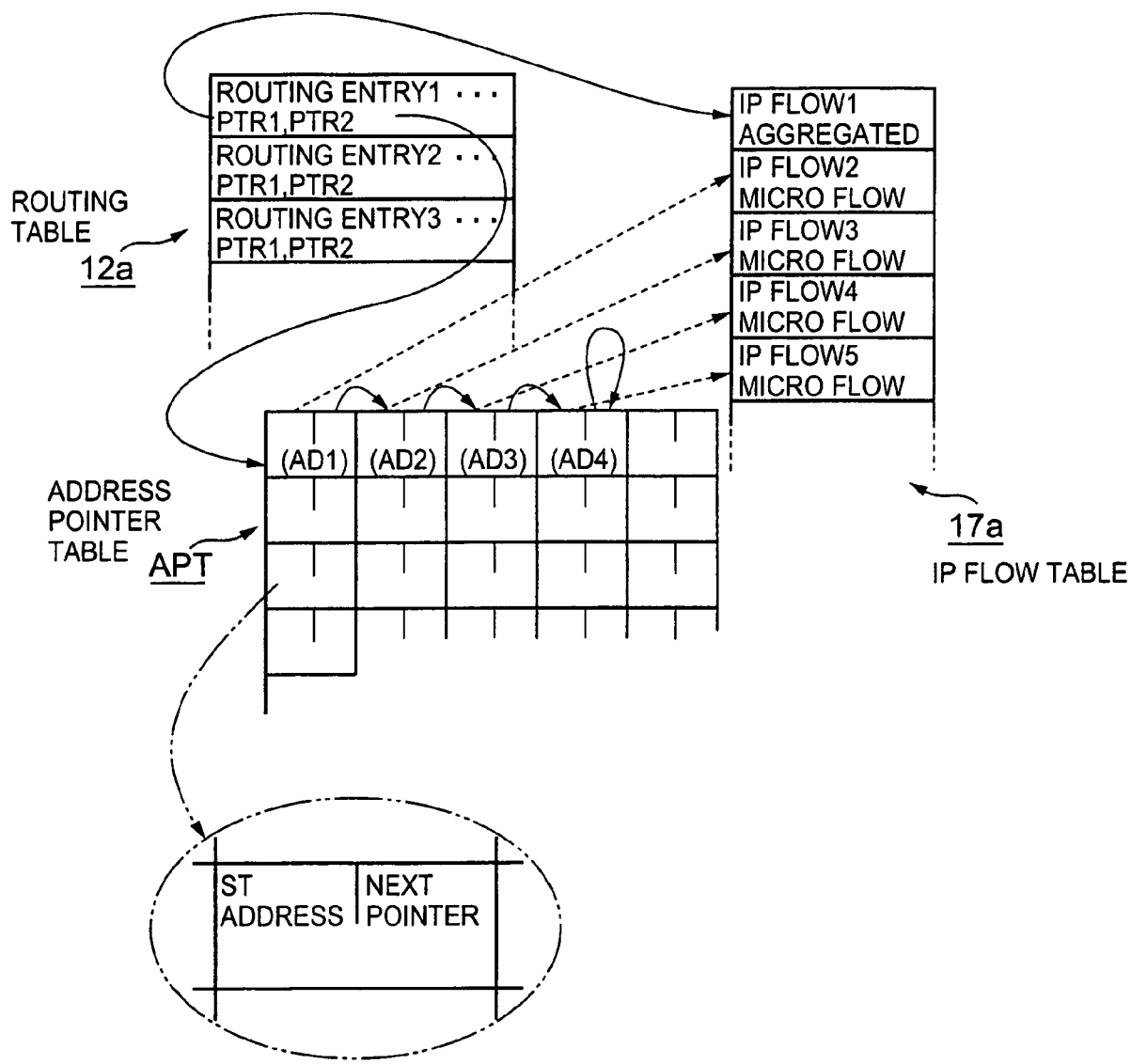
FIG. 3 is a diagram showing a relationship among routing table, IP flow table, and address pointer table for explaining an operation of the embodiment.

Hereinafter, taking a packet switching system as an example, a preferred embodiment of the present invention will be described.

As shown in FIG. 1, a packet switching system according to an embodiment of the present invention is provided with a microprocessor 11 and a main memory 12 connected to the microprocessor 11 by a processor bus 13, through which a packet processor 14 connected to a packet memory 15, a searcher 16, and a search memory 17 including an IP flow table 17a are connected to each other. The packet processor 14 is connected to a security processor 19 and lower-layer processors 20 through a switch fabric 18. The switch fabric 18 is connected to network interfaces (not shown) through the respective lower-layer processors 20.

The main memory 12 stores a routing table 12a and an address pointer table APT. The microprocessor 11 performs the entire control of the packet switching system and further performs packet processing such as packet next-hop determinations according to the predetermined routing algorithm and protocol and update of the routing table 12a depending on the routing results. The main memory 12 further stores control programs including the packet processing program to run on the microprocessor 11.

The routing table 12a is a database storing output port numbers and next-hop layer 2 addresses which are retrievable using a network prefix of an IP destination address included in a received packet as a search key. The routing table 12a is created and updated by the microprocessor 11 performing the routing processing. More specifically, the routing process is performed such that the routing table 12a is created on the main memory 12 by learning the network topology of a network connected to the packet switching system and computing metric and the routing table 12a is updated at regular intervals according to a specific routing protocol.

The address pointer table APT stores information representing relationships between entries of the routing table 12a and entries of the IP flow table 17a. The details of the address pointer table APT will be described later.

The packet processor 14 is a forwarding controller or a search controller, which performs IP header processing and forwarding of a received packet to a destination network interface 20 by starting up the searcher 16 to obtain a search result from the searcher 16.

The searcher 16, when started by the packet processor 14, searches the IP flow table 17a according to a search key composed of the IP source and destination addresses of a received packet. The search result is sent back to the packet processor 14.

The IP flow table 17a registers routing results obtained by the microprocessor 11 performing the routing process for each IP flow entry. The registered entries are managed by the software running on the microprocessor 11. The details will be described hereinafter.

As shown in FIG. 2, the IP flow table 17a can store a predetermined number of IP flow entries in the order in which the IP flows appeared. Each IP flow entry is composed of a search key and a routing result, and as necessary may include security information. The search key is composed of IP source address and IP destination address. The routing result is composed of MAC source address, MAC destination address, and output port number. Security information is composed of encryption algorithm, encryption key, new IP source address, and new IP destination address.

In the above-described configuration, when receiving a packet at a network interface, the packet is subject to layer-2 processing and is stored in the packet memory 15. the IP header of the packet stored in the packet memory 15 is analyzed by the packet processor 14 under control of the microprocessor 11. If it is determined that the packet has been normally received, then the IP header is transferred to the searcher 16.

When receiving the IP header, the searcher 16 extracts necessary data (here, IP destination address and IP source address) from the IP header and assembles a search key from the extracted data. The searcher 16 searches the IP flow table 17a according to the search key (here, composed of the IP destination address and IP source address). As shown in FIG. 2, the searcher 16 searches the search key field of the IP flow table 17a for a combination of the IP destination address and IP source address of the received packet.

When a hit is found in the IP flow table 17a, the routing result and security information corresponding to the hit search key are read from the IP flow table 17a. More specifically, the output port number, next-hop layer-2 address, encapsulating header and the like corresponding to the hit search key are read out and sent back to the packet processor 14. When receiving the found routing result and security information from the searcher 16, the packet processor 14 performs header updating based on these data and, if necessary, may start the searcher 16 searching the IP flow table 17a for the encapsulated IP header.

After the above-described IP header processing has been completed, the packet processor 14 reads out the corresponding packet data from the packet memory 15 to transfer the packet to a destination network interface through a corresponding lower-layer processor 20 in which the packet is subject to layer-2 and layer-1 processing.

It should be noted that the packet switching system as described above may perform security processing such as data encryption/decryption processing in units of a packet in addition to the routing processing. The details of the security processing have been disclosed in the Japanese Patent Application No. 11-098140 (Unexamined Publication No. P2000-295274A).

Referring to FIG. 3, the routing table 12a stores a plurality of routing entries, each of which has two pointers at the tail end thereof: PTR1 and PTR2. In the case where a routing entry itself is an aggregated IP flow, the pointer PTR1 indicates the address at which the aggregated IP flow corresponding to the routing entry is stored in the IP flow table 17a and the pointer PTR2 indicates the leading address of a linked list of micro flows belonging to the aggregated IP flow in the address pointer table APT. In the case where the routing entry itself is a micro flow, NULL is written into both the pointers PTR1 and PTR2.

The address pointer table APT is composed of a plurality of fixed-size memory blocks (e.g. 4 bytes) and stores link information representing a linked list of micro flows. Each of the memory blocks has a store address and a next pointer. The store address indicates the address at which a corresponding micro flow is stored in the IP flow table 17a. The next pointer indicates the address of a next memory block when a next entry exists and, if no next entry exists, then the address of its own.

It is assumed as shown in FIG. 3 that the pointer PTR1 of the routing entry 1 indicates the address of an aggregated flow (IP flow 1) and the pointer PTR2 indicates the leading address of a linked list of four micro flows (IP flows 2–5) as indicated by AD1–AD4 in the address pointer table APT. In the first memory block AD1, the store address indicates the first micro flow (IP flow 2) and the next pointer indicates the address of the second memory block AD2. In the second memory block AD2, the store address indicates the second micro flow (IP flow 3) and the next pointer indicates the address of the third memory block AD3. It is the same with the third memory block AD3. In the fourth memory block AD4, the store address indicates the fourth micro flow (IP flow 5) and the next pointer indicates the address of its own because the IP flow 5 is the bottom of the linked list.

The linked-list structure is managed by the microprocessor 11. When a micro flow belonging to the aggregate flow is detected, the microprocessor 11 looks at the pointers PTR1 and PTR2 to follow a chain of micro flows from IP flow 2 to IP flow 5 in the IP flow table 17a while referring to the address pointer table APT from the first memory block AD1 to the fourth memory block AD4. And the microprocessor 11 stores the new micro flow into an address following the bottom of the list in the IP flow table 17a and further stores new link information into the next memory block AD5 following the fourth memory block AD4. Accordingly, in the fourth memory block AD4, the next pointer indicates the address of the fifth memory block AD5. In the fifth memory block AD5, the store address indicates the fifth micro flow (IP flow 6) and the next pointer indicates the address of its own because the IP flow 6 is the bottom of the linked list. In this manner, the entries are sequentially registered in the IP flow table 17a in the order in which the packets arrived depending on traffic characteristics. Since each entry is added to the IP flow table 17a in the arrival order, the registered entries in the IP flow table 17a are not in orderly sequence.

On the other hand, in the case where the contents of the routing table 12a is changed due to dynamic routing operation, it is necessary to update the corresponding entries of the IP flow table 17a so as to be consistent with the update routing table 12a. If the IP flow table 17a were not updated, then the optimal routing cannot be achieved or some packets may be discarded on the following link. Therefore, when the routing table 12a has been updated, the microprocessor 11 determines where relevant entries linked in a chain are stored in the IP flow table 17a by referring to the address pointer table APT as described above. When such a linked list of entries have been found, the microprocessor 11 update them so as to be consistent with the routing table 12a.

As described above, the microprocessor 11 is allowed to directly access each of linked entries scattered throughout the IP flow table 17a by following a chain of address pointers in the address pointer table APT without any searching operation. Accordingly, it is very easy to change and delete an entry of the IP flow table 17a, resulting in high-speed searching and updating.

Data Search

When a packet is received at a network interface, the packet processor 14 starts up the searcher 16. When receiving the IP header from the packet processor 14, the searcher 16 extracts search key data (here, IP destination address and IP source address) from the IP header (step S101) and searches the IP flow table 17a according to the search key (step S102). When a hit is found in the IP flow table 17a (YES at step s103), necessary information including the corresponding output port number are read out (step S104) and sent back to the packet processor 14 or the microprocessor 11 (step S105). When no hit is found in the IP flow table 17a (NO at step s103), control goes to a data registration routine. DATA REGISTRATION Referring to FIG. 5, when the data registration procedure starts, the IP header information is transferred to the microprocessor 11 (step S106) and the routing processing is performed (step S107). More specifically, the IP header is analyzed to form a search key and the routing table 12a is searched according to the search key. The routing result is registered in the IP flow table 17a (step S108).

Thereafter, it is determined whether the received packet is a micro flow (step S109). If it is a micro flow (YES at step S109), the microprocessor 11 reads the pointer PTR2 of the relevant routing entry from the routing table 12a (step S110) and accesses the leading address of a linked list in the address pointer table APT and traces linked memory blocks to find the bottom of the list (step S111). Then, the micro flow address on the IP flow table is added to the bottom of the list (step S112) and the data registration procedure is terminated.

If it is determined that the received packet is not a micro flow (NO at step S109), the micro flow address on the IP flow table is written into the pointer PTR1 of the relevant routing entry in the routing table 12a (step S113).

The data registration on the IP flow table 17a is performed as described above. Accordingly, when a packet having the same IP header information, the routing processing is performed by searching only the IP flow table, allowing high-speed packet routing or forwarding.

Data Deletion

As described before, if there is data with low use frequency or data after the expiration of a preset time interval, then the data is deleted from the IP flow table 17a and the routing table 12a as described hereinafter.

Figure 6:
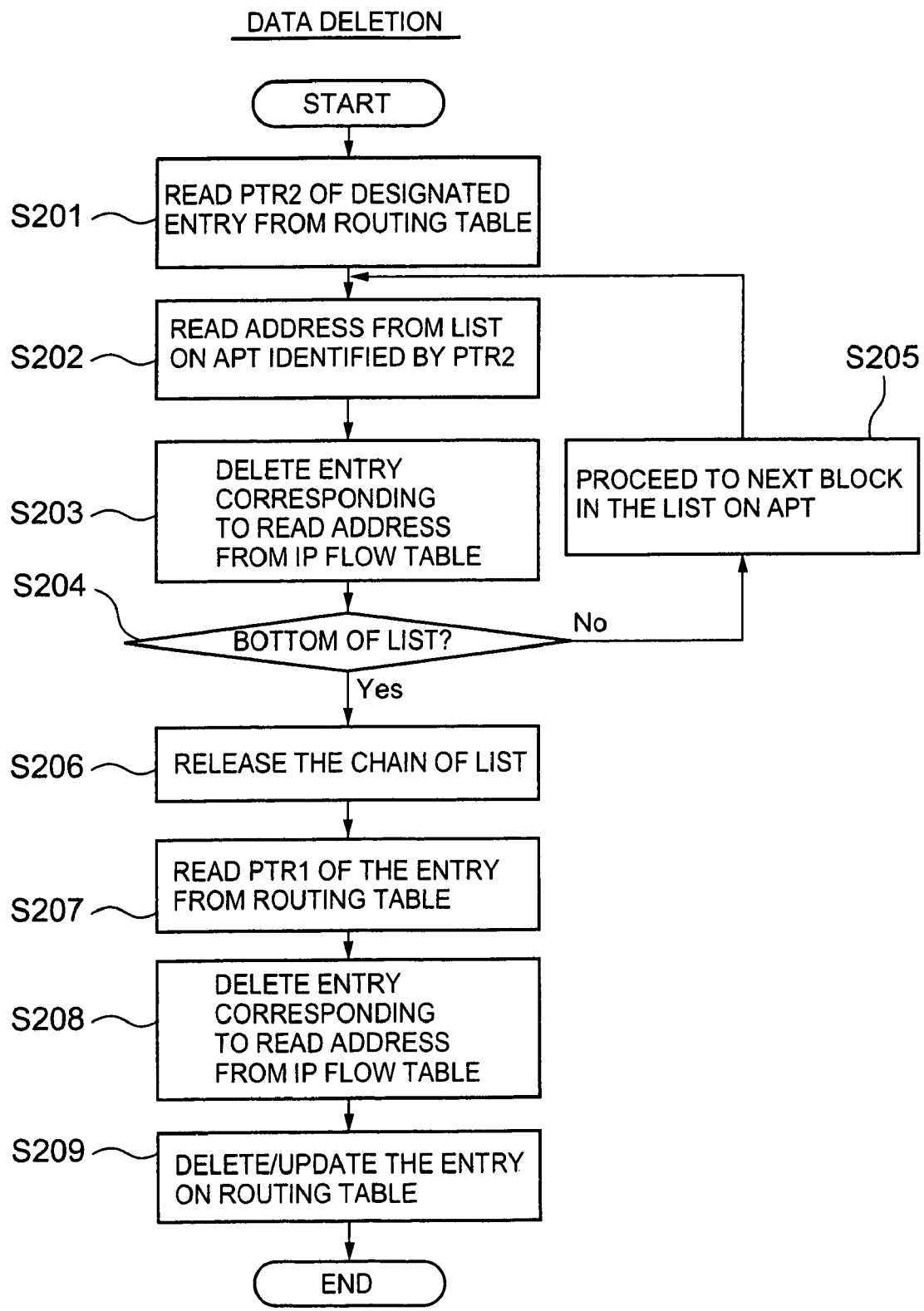
FIG. 6 is a flow chart showing a data deletion operation of the embodiment.

Referring to FIG. 6, after reading out the pointer PTR2 of a designated routing entry to be deleted from the routing table 12a (step S201), the store address stored in the memory block indicated by the read pointer PTR2 is read out from the address pointer table APT (step S202). Then, the entry at the read store address (here, a micro flow) is deleted from the IP flow table 17a (step S203). Thereafter, it is determined whether the current memory block is the bottom of the list (step S204). When it is not the bottom of the list (NO at step S204), the next memory block on the list is accessed (step S205) and the steps S202–203 are repeatedly performed while proceeding to next memory block until reaching the bottom of the list.

When it is determined that the current memory block is the bottom of the list (YES at step S204), the chain of relevant list is released on the address pointer table (step S206) and the pointer PTR1 of the relevant entry is read from the routing table 12a (step S207). Then, the entry at the address indicated by the read pointer PTR1 (here, an aggregate flow) is deleted from the IP flow table 17*a* (step S208). Further, the relevant routing entry is deleted from the routing table 12*a* (step S209).

In this way, all the related pieces of data can be efficiently deleted from each of the routing table 12*a*, the IP flow table 17*a*, and the address pointer table APT.

As described above, the address pointer table provides relationships between entries of the routing table and entries of the IP flow table. By referring to the address pointer table, the microprocessor can directly find linked IP flows from the IP flow table without searching the IP flow table. Therefore, the table management for encapsulated IP packet flows can be simplified and the time required for packet routing and forwarding processing can be dramatically reduced, resulting in improved throughput of the packet switch.

Further, the address pointer table is used to provide relationships between entries different in structure and attribute of a search key, allowing simplified system configuration of a packet switch requiring aggregate processing of IP flows such as IPsec and Diffserve.

Figure 4:
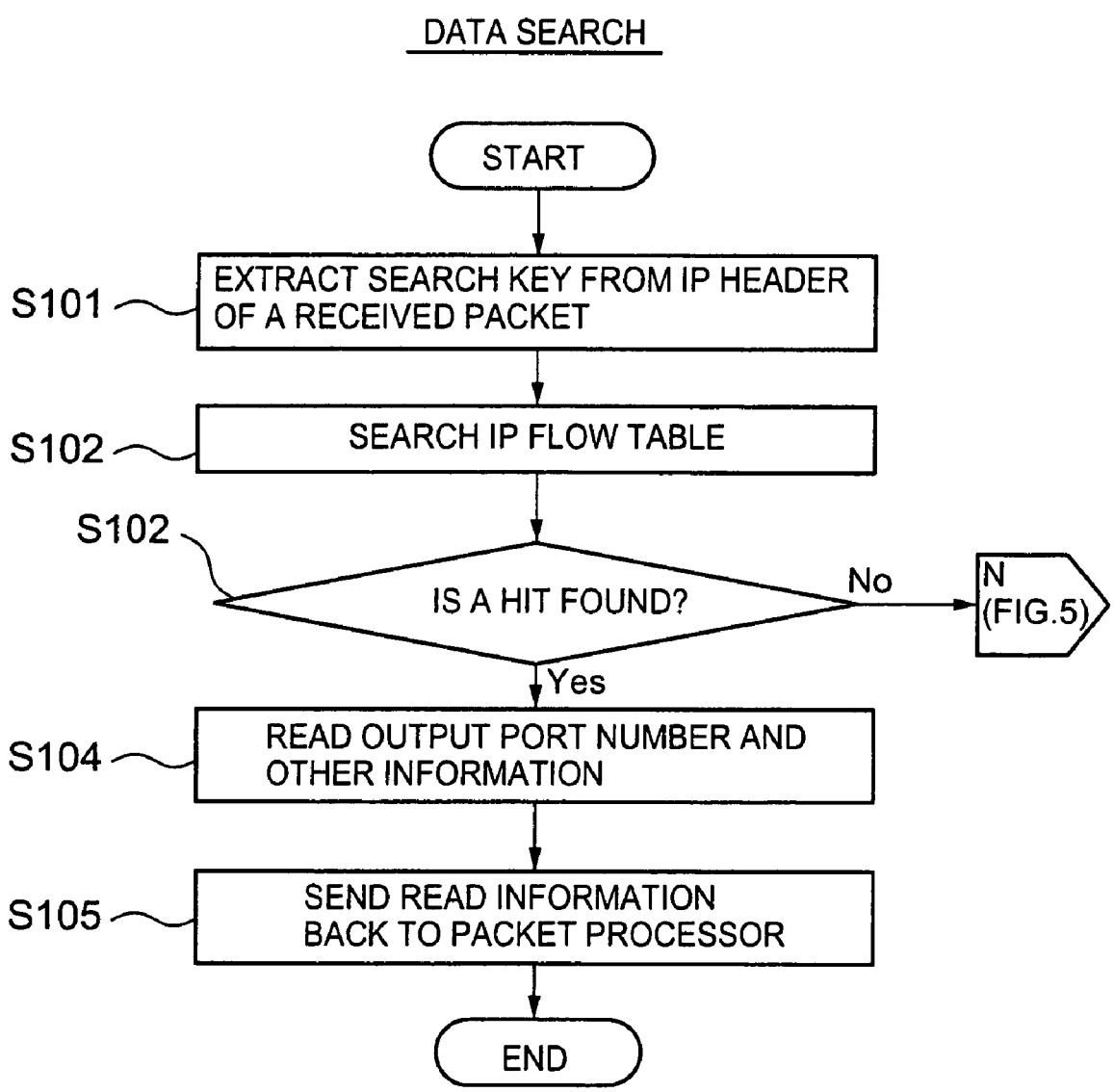
FIG. 4 is a flow chart showing a data search operation of the embodiment.
Figure 5:
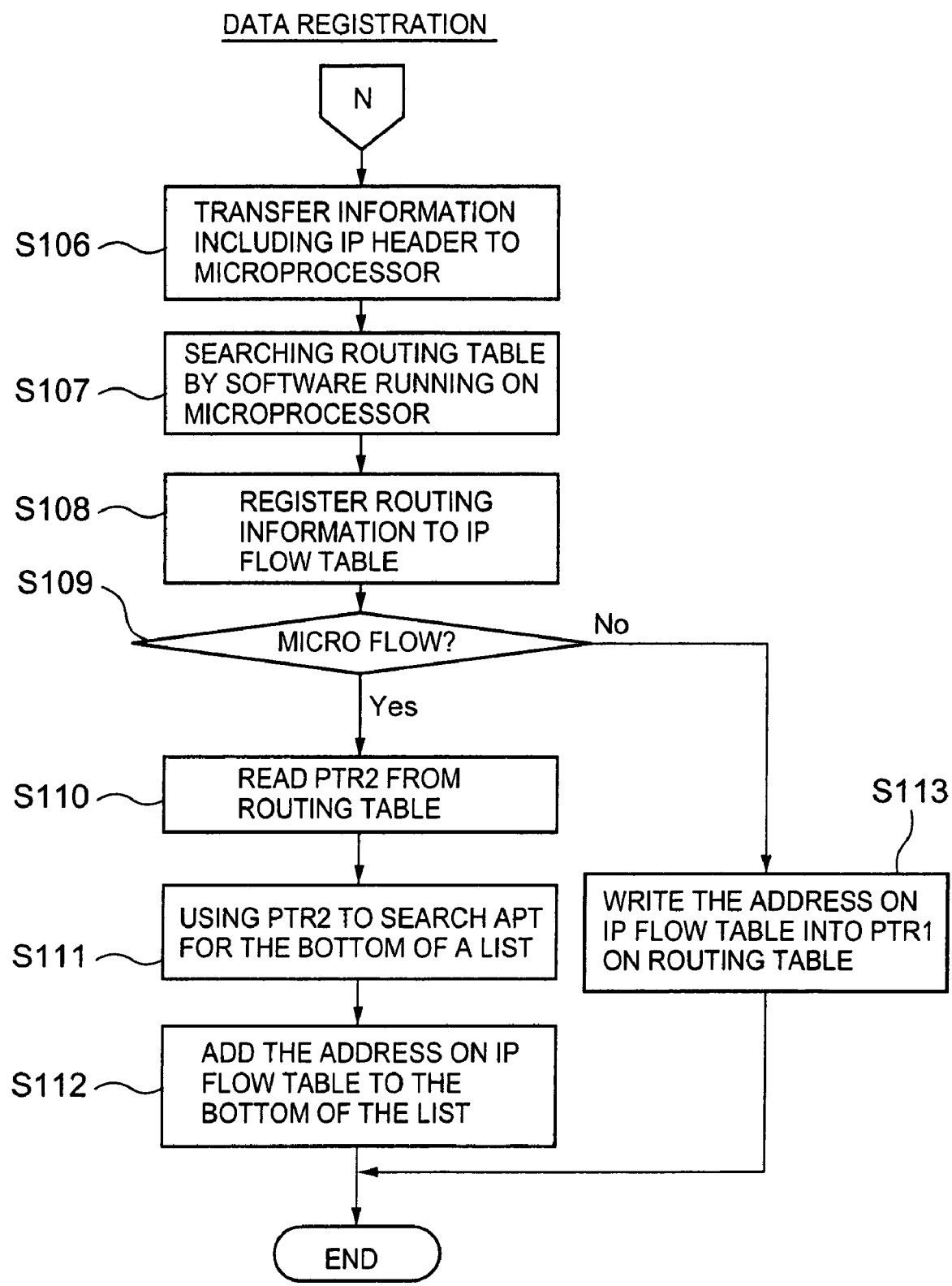
FIG. 5 is a flow chart showing a data registration operation of the embodiment.

The present invention is also applicable to any searching system having a search table in addition to a database, wherein the searching table is designed to store data that has been retrieved from the database. More specifically, an address pointer table is provided, which can provide relationships between entries of the database and entries of the search table. By referring to the address pointer table, the search processor can directly find linked pieces of data from the search table without searching the search table (see FIG. 4). Further, if no hit is found in the search table, the data registration is performed as shown in FIG. 5. Furthermore, in the case where any data of the search table should be deleted under condition of expiration or the like, the data deletion is performed as shown in FIG. 6. Therefore, in the case where a plurality of pieces of data is linked to form a list, all the data of the list can be retrieved, registered, and deleted rapidly.

The invention claimed is:

1. A data searching system comprising:
a routing table for storing a plurality of next-hop addresses;
a cache memory storing an IP flow table for storing at least one next-hop address which has been selected from the routing table; and
an address pointer table for storing location information indicating an entry address of each next-hop address stored in the IP flow table and relationship information among entry addresses of next-hop address stored in the IP flow table, wherein the address pointer table comprises a plurality of memory blocks each having a fixed length on a recording medium, located at consecutive addresses,
each memory block comprising:
a first area for storing an entry address indicating a location of a corresponding piece of data stored in the IP flow table; and
a second area for storing one of a next block address and a bottom-indicating flag, the next block address indicating an address of a memory block storing data following the corresponding piece of data, and the bottom-indicating flag indicating that a current memory block is a bottom of a list.

2. The data searching system according to claim 1, further comprising:
a controller controlling such that the IP flow table is searched for a desired next-hop address before the routing table and, if a hit is found in the IP flow table, then a found next-hop address is used as a search result, and if no hit is found in the cache memory storing the IP flow table, then the routing table is searched for the desired next-hop address and a found next-hop address is used as a search result and is registered into the IP flow table, wherein a next-hop address with low retrieved frequency is deleted from the IP flow table according to a predetermined condition and all linked memory blocks related to the deleted piece of data are released into available memory blocks.

3. A packet processing system comprising:
a microprocessor;
a routing table;
a cache memory storing an IP flow table which is used to increase search speed for packet forwarding; and
an address pointer table for storing location information indicating an entry address of each piece of data stored in the IP flow table and relationship information among entry addresses of pieces of data stored in the IP flow table, wherein the address pointer table comprises a plurality of memory blocks each having a fixed length on a recording medium, located at consecutive addresses,
each memory block comprising:
a first area for storing an entry address indicating a location of a corresponding piece of data stored in the IP flow table; and
a second area for storing one of a next block address and a bottom-indicating flag, the next block address indicating an address of a memory block storing data following the corresponding piece of data, and the bottom-indicating flag indicating that a current memory block is a bottom of a list.

4. A packet processing system comprising:
a microprocessor;
a routing table;
a searcher having a cache memory connected thereto, wherein the cache memory stores a search table to increase search speed for packet forwarding; and
an address pointer table for storing location information indicating an entry address of each piece of data stored in the search table and relationship information among entry addresses of pieces of data stored in the search table, wherein the address pointer table comprises a plurality of memory blocks each having a fixed length on a recording medium, located at consecutive addresses,
each of the memory blocks comprises:
a first area for storing an entry address indicating a location of a corresponding piece of data stored in the search table; and
a second area for storing one of a next block address and a bottom-indicating flag, the next block address indicating an address of a memory block storing data following the corresponding piece of data, and the bottom-indicating flag indicating that a current memory block is a bottom of a list.

5. The packet processing system according to claim 4, wherein the address pointer table is provided in a main memory of the microprocessor.

6. The packet processing system according to claim 4, wherein the address pointer table is provided in the cache memory.

7. A control method for controlling a packet processing system comprising:
a microprocessor;
a routing table;

a searcher having a cache memory connected thereto, wherein the cache memory stores a search table to increase in search speed for packet forwarding; and an address pointer table for storing location information indicating an entry address of each piece of data stored in the search table and relationship information among entry addresses of pieces of data stored in the search table, the control method comprising:
  a) when the routing table has been updated, accessing the address pointer table based on contents of an entry to be changed to obtain location information of the entry to be changed and entries related to the entry to be changed in the cache memory; and
  b) changing the entry and related entries so as to be consistent with the routing table, wherein the address pointer table comprises a plurality of memory blocks each having a fixed length on a recording medium, located at consecutive addresses, each memory block comprising:
  a first area for storing an entry address indicating a location of a corresponding piece of data stored in the IP flow table; and
  a second area for storing one of a next block address and a bottom-indicating flag, the next block address indicating an address of a memory block storing data following the corresponding piece of data, and the bottom-indicating flag indicating that a current memory block is a bottom of a list.

8. A system comprising:
a first memory for retrievably storing a plurality of next-hop address entries;
a cache memory for storing a copy of a next-hop address entry that has been retrieved from the first memory to retrievably store a plurality of retrieved next-hop address entries;
a second memory for storing a list of retrieved next-hop address entries which are linked from a leading one to a bottom one; and
a data controller for accessing a desired retrieved next-hop address entry by referring to the list stored in the second memory.

9. The system according to claim 8, wherein the data controller processes the desired retrieved next-hop address entry so as to be consistent with a corresponding next-hop address entry stored in the first memory when the corresponding next-hop address entry has been processed.

10. The system according to claim 8, wherein each of the next-hop address entries stored in the first memory has a first indicator and a second indicator, the first indicator indicating which one of a single entry and an aggregated entry the entry relates to, wherein the aggregated entry has a plurality of single entries belonging thereto, and the second indicator indicating a leading address of the list in the third memory.

11. The system according to claim 10, wherein, when an aggregated entry stored in the first memory is designated, the data controller accesses the second memory depending on the second indicator of the aggregated entry to trace the list of single entries related to the aggregated entry so as to access the single entries related to the aggregated entry.

12. The system according to claim 11, wherein, when contents of the first memory have been updated, the data controller processes the single entries related to the aggregated entry so as to be consistent with the contents of the first memory.

13. The system according to claim 8, wherein the list of retrieved next-hop address entries comprises a plurality of memory blocks each corresponding to the retrieved entries, the memory blocks comprising an address of a corresponding retrieved entry in the cache memory and a next pointer indicating one of an address of a next memory block following the memory block and an address of the memory block itself.

14. A packet switching system comprising:
a routing table for retrievably storing a plurality of routing entries;
a cache memory for storing a flow table having a copy of a routing entry indicating a packet flow that has been retrieved from the routing table to retrievably store a plurality of retrieved packet flows;
an address pointer table for storing a list of retrieved packet flows which are linked from a leading one to a bottom one;
a search processor for accessing a desired retrieved packet flow in the flow table by referring to the list stored in the address pointer table; and
a microprocessor performing a packet routing control.

15. The packet switching system according to claim 14, wherein, when a routing entry has been designated to be processed according to predetermined routing processing, the search processor processes a corresponding retrieved packet flow in the flow table so as to be consistent with the designated routing entry stored in the routing table.

16. The packet switching system according to claim 14, wherein each of the routing entries stored in the routing table has a first indicator and a second indicator, the first indicator indicating which one of a single packet flow and an aggregated packet flow the routing entry relates to when the aggregated packet flow has a plurality of single packet flows belonging thereto, and the second indicator indicating a leading address of the list in the address pointer table.

17. The packet switching system according to claim 16, wherein, when an aggregated routing entry stored in the routing table is designated, the search processor accesses the address pointer table depending on the second indicator of the aggregated routing entry to trace the list of single packet flows related to the aggregated routing entry so as to access the single packet flows related to the aggregated routing entry.

18. The packet switching system according to claim 17, wherein the search processor processes the single packet flows related to the aggregated routing entry so as to be consistent with the routing table when the routing table has been updated.

19. The packet switching system according to claim 14, wherein the list of retrieved packet flows comprises a plurality of memory blocks each corresponding to the retrieved packet flows, the memory blocks comprising an address of a corresponding retrieved packet flow in the flow table and a next pointer indicating one of an address of a next memory block following the memory block and an address of the memory block itself.

20. A packet switching method comprising:
  a) retrievably storing a plurality of routing entries in a routing table;
  b) storing a copy of a routing entry indicating a packet flow that has been retrieved from the routing table to retrievably store a plurality of retrieved packet flows in a cache memory;

c) storing a list of retrieved packet flows which are linked from a leading one to a bottom one in an address pointer table; and
d) accessing a desired retrieved packet flow in the cache memory by referring to the list stored in the address pointer table.

21. The packet switching method according to claim 20, wherein the step (d) comprises:
   when a packet flow corresponding to a received packet fails to be found in the cache memory, searching the routing table for the packet flow;
   registering the found packet flow as a routing result into the cache memory;
   determining whether the found packet flow is a micro flow belonging to an aggregated flow;
   when the found packet flow is the micro flow, searching the cache memory for a bottom retrieved packet flow of the list corresponding to the aggregated flow;
   adding the found packet flow to the bottom retrieved packet flow stored in the cache memory; and
   when the found packet flow is not the micro flow, storing an address of the found packet flow in the cache memory into a corresponding routing entry in the routing table.

22. The packet switching method according to claim 20, wherein the step (d) comprises:
   when an aggregated routing entry has been designated to be deleted, deleting each of the retrieved packet flows included in a list related to the aggregated routing entry from the address pointer table until finding a bottom retrieved packet flow of the list;
   releasing a chain of the retrieved packet flows formed in the address pointer table to make them available;
   deleting a retrieved packet flow corresponding to the aggregated routing entry from the cache memory; and
   deleting the aggregated routing entry from the routing table.

* * * * *